United States Patent [19]

Licht et al.

[11] Patent Number: 5,413,881
[45] Date of Patent: May 9, 1995

[54] ALUMINUM AND SULFUR ELECTROCHEMICAL BATTERIES AND CELLS

[75] Inventors: Stuart Licht, Charlton City; Dharmasena Peramunage, Oxford, both of Mass.

[73] Assignee: Clark University, Worcester, Mass.

[21] Appl. No.: 383

[22] Filed: Jan. 4, 1993

[51] Int. Cl.⁶ ............................................. H01M 4/02
[52] U.S. Cl. .................................... 429/105; 429/103; 429/104
[58] Field of Search ................... 429/105, 104, 103, 50

[56] References Cited

U.S. PATENT DOCUMENTS

| | | |
|---|---|---|
| 3,189,486 | 6/1965 | Pryor et al. |
| 3,953,239 | 4/1976 | Anderson. |
| 4,107,406 | 8/1978 | Moden et al. |
| 4,150,204 | 4/1979 | Moden et al. |
| 4,828,942 | 5/1989 | Licht ............................. 429/50 |
| 4,833,048 | 5/1989 | Dejonghe et al. ............. 429/104 |
| 4,950,560 | 8/1990 | Tarcy. |
| 5,004,654 | 4/1991 | Hunter et al. .................. 429/50 |
| 5,260,144 | 11/1993 | O'Callaghan .................. 429/14 |

FOREIGN PATENT DOCUMENTS 2020478 11/1979 United Kingdom.

OTHER PUBLICATIONS

Licht et al., *Inorg. Chem.*, 25:2486–89 (1986).
Licht et al., *Appl. Phys. Lett.*, 46:608–10 (1985).
Licht, *Electrochemical Society Extended Abstracts*, 85-2:517–18 (1985).
*J. Electroanal. Chem. Interfacial Electrochem.*, 318:111–29 (1991)*.
Licht et al., *J. Electrochem. Soc.*, 134:1064–70 (1987).
Licht et al., *Inorg. Chem.*, 25:2486–89 (1986)*.
Licht et al., *J. Electrochem. Soc.*, 133:277–80 (1986).
Licht et al., *J. Electrochem. Soc.*, 133:272–77 (1986).
Licht, *J. Phys. Chem.*, 90:1096–99 (1986).
Licht et al., *J. Electrochem. Soc.*, 132:1076–81 (1985).
Licht et al., *Appl. Phys. Lett.*, 46:608–10 (1985)*.
Licht, *Electrochemical Society Extended Abstracts*, 85:–2:517–18 (1985)*.
*J. Electrochem. Soc.*, 131:950–51 (1984).
*J. Electroanal. Chem. Interfacial Electrochem.*, 318:111–29 (1991)*.
Literature Search Report of Stuart Licht articles, Feb. 22, 1993.
Literature Search Report of full records of items from Feb. 22, 1993 search of Stuart Licht, Feb. 23, 1993.
Licht, *J. Electrochem. Soc.* 134: 2137 (1987).

*Primary Examiner*—Prince Willis, Jr.
*Assistant Examiner*—M. Nuzzolillo
*Attorney, Agent, or Firm*—Fish & Richardson

[57] ABSTRACT

A battery is provided comprising an aluminum anode, an aqueous sulfur catholyte, and a second electrode capable of reducing sulfur. A polysulfide cathode (for use with the above battery or independently) includes solid sulfur at ambient temperatures, and the cathodic charge stored in that solid sulfur can be directly accessed. An anode (for use with the above battery or independently) is also described, with the ability to utilize a substantial fraction of the anodic charge stored in the aluminum when immersed in electrolytes containing over 10 molar alkaline hydroxide.

27 Claims, 6 Drawing Sheets

ALUMINUM AND SULFUR ELECTROCHEMICAL BATTERIES AND CELLS

BACKGROUND OF THE INVENTION

The invention relates to electrochemical batteries of the type having half cells in operative electrochemical contact.

There is a societal need for cost effective batteries having a high energy density and a moderate to high discharge rate. Such batteries can be used for applications ranging from flashlights to electrically powered vehicles.

A variety of metal/molten sulfur batteries have been presented with a primary focus on sodium/sulfur cells. The light weight of sulfur makes these systems attractive for electrochemical energy storage; however material constraints associated with the requisite high temperatures, corrosion, thermal cycling, and cell fabrication have slowed their development. Typically, such cells are designed to operate at temperatures of 300° to 350° C. to maintain the sodium, sulfur and reaction products in a liquid state and to obtain adequate electrolyte conductivity. See, e.g., D. Linden, *Handbook of Batteries*, McGraw-Hill, N.Y. (1984).

At low (room) temperatures, elemental sulfur is a solid, an insulator, and highly insoluble; elemental sulfur is not expected to provide a useful cathode material at low temperatures.

In 1989, a low temperature alternative sulfur battery was presented. See Licht, U.S. Pat. No. 4,828,942, which is hereby incorporated by reference. Licht '942 describes a water-based battery using electrolytes which by mass could accommodate a high concentration of reducible sulfur. Indeed such batteries may be able to achieve sulfur concentrations that provide more reducible sulfur (by mass) than water. The resultant electrolyte retains high coulombic capacities similar to those in molten sulfur batteries, yet operates at moderate temperature and is highly conductive. The maximum charge density is described for a cell containing excess $K_2S_4$ (potassium tetrasulfide) in contact with a saturated $K_2S_4$ solution, with a maximum storage capacity of $2.8 \times 10^6$ C/kg (coulombs per kilogram), limited by the solid $K_2S_4$ capacity. The room temperature sulfur electrolyte provides a conductive, reversible, and high capacity half-cell storage material for the battery.

Choices for the second half-cell to combine with the sulfur cell described above (Licht U.S. Pat. No. 4,828,942), such as tin and highly reduced sulfur, generally have led to low battery voltages (0.6 volt and less). See, e.g., Licht, J. *Electrochem. Soc.* 134:2137 (1987). There is a large energy difference between sulfur and various alternative choices for second half-cells to complete the battery. Although this large energy difference provides the theoretical possibility of high energy storage, it also can lead to rapid undesired chemical reaction between the materials in the battery.

An object of the invention is to provide a safe and reliable battery capable of producing high energy densities. Another object of the invention is to provide a battery made of relatively inexpensive materials.

Another object of the invention is to provide a battery that can include seawater in the solutions, so that the battery will operate when immersed in seawater or the like.

SUMMARY OF THE INVENTION

One aspect of the invention provides a battery (an electrical storage cell) comprising two half cells, one based on aluminum the other based on sulfur. Specifically, one half cell comprises an anode that includes aluminum positioned in contact with a first aqueous, electrically neutral, alkaline solution. The other half cell comprises a second electrically neutral solution that contains at least 0.01 moles per kilogram of reducible sulfur and that contains polysulfide anions. The second half cell further comprises a current transferring electrocatalytic electrode positioned in electron-transferring contact with the second aqueous electrically neutral solution. Without being bound to any theory, it appears that the overall electrochemical reaction for the battery is shown by the following equation (equation I):

$$2Al + 3S + 3OH^- + 3H_2O \rightarrow 2Al(OH)_3 + 3HS^-;$$
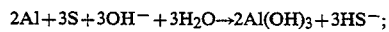
$$E_{cell} = 1.8 \text{ V}$$

Accordingly, this aspect of the invention provides a battery in which the sulfur is electrochemically reduced in solution while solid aluminum is simultaneously oxidatively discharged. Batteries according to this aspect of the invention are expressed by aluminum oxidation and sulfur reduction for an overall battery discharge, as shown by the following equation (equation II):

$$2Al + 3S \rightarrow Al_2S_3$$
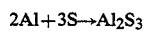

In alkaline aqueous solutions, aluminum and sulfur chemistry results in many species in solution, such as $Al(OH)_4^-$, $S_2$, $S_x^{2-}$, where $x = 2, 3, 4$, etc. To simplify the analysis, however, the relevant aluminum and polysulfide half cells may be represented by the following equations (equations III and IV):

$$Al + 3OH^- \rightarrow Al(OH)_3 + 3e^- \quad E° = -2.3 \text{ V vs SHE},$$
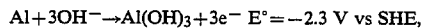

where SHE = volts versus standard hydrogen electrode, and $$3S + 3H_2O + 6e^- \rightarrow 3HS^- + 3H_2O \quad E° = -0.5 \text{ V vs SHE}$$
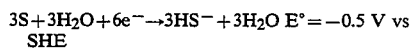

In accordance with Equation I, the faradaic capacity of the aluminum/sulfur battery (based on potassium salts and all reactants) is 432 Ah/kg (ampere hours/kilogram), and the theoretical energy density is: 1.8 Volt × 432 Ah/kg = 777 Wh/kg (watt hours/kilogram). This 777 Wh/kg aluminum/sulfur battery energy density compares favorably with conventional aqueous batteries, such as lead/acid, nickel/cadmium, zinc/manganese oxide and zinc/silver oxide batteries with theoretical energy densities of 170, 217, 336 and 447 Wh/kg, respectively. Utilization of lighter weight cations than potassium may further improve the aluminum/sulfur battery energy capacity. For example, utilization of sodium or lithium hydroxide in lieu of potassium hydroxide in equation I increases theoretical energy density to 893 and 1049 Wh/kg, respectively.

A second aspect of the invention features batteries as in the first aspect, in which the anode (the second half cell) comprises a metal selected from the group consisting of lithium, calcium, magnesium instead of aluminum. Calcium, magnesium and lithium anodes offer relatively high theoretical storage capacities. For example, their theoretical storage capacities are as high as 80, 132 and 232 A min/g (ampere minutes/gram), respectively. This is substantially higher than the theoretical storage capacities of most conventional aqueous anode materials. For example, the storage capacity of lead is 15.5 A min/g, of cadmium is 28.8 A min/g, and of zinc 49.2 A min/g. Preferably the anode comprises one of the above metals at a purity of at least 99.9% or an alloy of one of the above metals.

A third aspect of the invention generally features a method of generating a direct current between two contact points using the battery of the first or the second aspect of the invention by establishing electrical contact between the battery anode and one of the points and between the battery cathode and the other point. The polysulfide anions are reduced and the anode is oxidized, producing a complementary redox species and generating an electrical current and potential between the two contact points.

In preferred embodiments of the first three aspects of the invention, at least one of the aqueous solutions is maintained in contact with a solid phase redox agent, e.g., the second solution is in contact with solid phase sulfur or solid polysulfide salts. The first solution can be in contact with hydroxide salts. Also preferably, the electrocatalytic electrode comprises a porous material, such as cobalt sulfide deposited on porous nickel or porous brass. Alternative electrocatalytic electrodes comprise a metal, metal chalcogenide or metal oxide, which is insoluble in sulfide or polysulfide solutions; preferred metals are platinum, palladium, nickel, copper, cobalt, manganese, tungsten, steel, molybdenum, iridium, zinc, lead, alloys of the above metals, oxides of the above metals, and chalcogenides of the above metals. Still another possible electrocatalytic electrode material is carbon.

In still other preferred embodiments of the first three aspects of the invention, the second aqueous solution is also alkaline (it comprises a hydroxide such as hydroxides of the cations listed below), and it comprises a soluble polysulfide compounds such as phosphorous polysulfide and arsenic polysulfide. The second aqueous solution also preferably comprises a polysulfide salt containing a cation selected from the group consisting of $Li^+$, $Na^+$, $K^+$, $Rb^+$, $Cs^+$, $NH_4^+$, $Mg^{2+}$, $Ca^{2+}$, $Ba^{2+}$ and $Al^{3+}$.

Also preferably, the first aqueous solution includes a salt having a halide, nitrate, or sulfate anion, such as a salt containing a cation selected from the group consisting of $Li^+$, $Na^+$, $K^+$, $Rb^+$, $Cs^+$, $NH_4^+$, $Mg^{2+}$, $Ca^{2+}$, $Ba^{2+}$ and $Al^{3+}$. Preferably, at least one of the aqueous solutions has a conductivity selected from the range of 0.001 mho/cm to 2 mho/cm, and at least one of the aqueous solutions includes seawater. The first aqueous solution may also include additive salts, such as indium hydroxide, germanium oxide, sodium stannate, gallium oxide and imidazole. Preferably, the anode surface is pretreated to increase coulombic efficiency of the anode, by pretreating to produce a mercury amalgam on the anode surface.

As noted above, aluminum (and other metals including lithium) undergo a chemical reaction in concentrated aqueous alkaline or alkaline polysulfide electrolytes which is rapid and would be expected to release heat rather than electricity. Therefore, these materials would not be expected to provide useful second half cell couples for polysufide cells. Unlike zero valent sulfur, however, reduced sulfur does not rapidly react with aluminum or the other anodic metals according to the invention. This characteristic of sulfur permits stored energy to be extracted in the desired electrochemical reaction if a suitable percentage of the solution phase sulfur is reduced to avoid chemical reaction with aluminum or the other anodic metals. Suitable strategies that can be used separately or in combination to avoid the undesired chemical reaction include: maintaining a large polysulfide flux near the current collector; maintaining a substantial quantity of the reducible sulfur in the solid phase prior to discharge; and isolating the polysulfide with a separator or membrane. A large polysulfide flux can be maintained by confining the polysulfide through or near the surface of an effective electrocatalyst. A current transferring electrode may be situated in the cathodic compartment such that the majority of the available sulfur is reduced prior to its interaction with aluminum (or the other anodic metals). The electrocatalytic current collector cathode is stable and lightweight (e.g. a thin film metal sulfide such as cobalt sulfide) to provide current transfer from the solution phase with minimal voltage and energy density losses.

One advantage of the invention is a high cathodic storage capacity with reducible sulfur comprising at least 0.01 moles per kilogram of the catholyte. The reducible sulfur is situated to provide access to the electrocatalytic electrode, and it is provided by dissolution of polysulfide salts, and/or solid phase polysulfide salts, and/or solid phase sulfur in contact with the solution. Polysulfide salts are of the formula $M_xS_y$, such as $K_2S_4$, where M is a cation of charge $z+$, and will contain reducible sulfur when $2y-zx$ is greater than zero. Many cations provide polysulfide salts, such as where M is Li (lithium), Na (sodium), K (potassium), Rb (rubidium), Cs (cesium), $NH_4$ (ammonium), Ba (barium), Sr (strontium), and Ca (cadmium).

In other preferred features, an aluminum electrode constitutes both the consumed anode material and the second current transferring electrode in the battery. The anode of the battery of this invention can be pure aluminum, which is readily available at a purity of at least 99.9% or an aluminum alloy. The aluminum alloy has a composition which permits the electrochemical reaction at the anode to proceed as set forth above by Equation I. Representative suitable alloys include aluminum-magnesium, aluminum-tin, aluminum-gallium, aluminum-indium, aluminum-indium-tin, aluminum-magnesium-tin, aluminum-magnesium-tin-gallium, or the like. The aluminum is immersed in an anolyte, an aqueous electrolyte containing more than 1 molal of aqueous base, such as KOH or NaOH (sodium hydroxide), and a minimum (less than 20 percent by weight) of dissolved sulfur. As detailed below, higher concentrations of aqueous base can increase energy density and conductivity of the cell, and additives can be placed in solution to enhance cell potential, decrease polarization losses, and diminish the rate of a secondary parasitic side reaction in which aluminum reacts to evolve hydrogen. These additives include imidazole, indium, tin, and gallium metals oxide salts.

In a fourth aspect, the invention features an electrochemical cell, suitable for use in electrochemical storage systems, that permits a very high charge density and can be used in the sulfur batteries of the first three aspects of the invention as well as in other batteries. The cell includes: a) an aqueous salt solution comprising polysulfide anions, the solution containing at least about 0.01 moles per kg reducible sulfur; b) solid sulfur in contact with said aqueous solution, the solid sulfur being present in an amount at least 1 percent by weight of said aqueous solution; and c) a current transferring electrocatalytic electrode positioned in ion current transferring contact with the aqueous solution. The solid sulfur in the cell will not dissolve in a polysulfide solution saturated in sulfur (e.g. a 1 to 4 molar $K_2S_4$ solution that is approximately saturated in zero valent sulfur). Initiation of reductive discharge of the cell will generate shorter length polysulfide species:

$$3S_4^{2-} + 2e^- \rightarrow 4S_3^{2-},$$

which then permits dissolution and continued reduction of available solution and solid phase sulfur:

$$S_3^{2-} + S \rightarrow 4S_4^{2-}.$$

This solid/solution phase sulfur cathode has the benefits of higher storage capacity and higher cell voltage. The solid sulfur maintains longer chain polysulfide species in solution which cathodically shifts and maximizes cell voltage. The theoretical maximum storage capacity using solid sulfur is substantially higher than the previous limit of $2.8 \times 10^6$ C/kg capable with solid $K_2S_4$ storage. This limit (as all solid sulfur is dissolved and reduced in water) is given by the equation:

$$S + H_2O + 2e^- \rightarrow HS^- + OH^+$$

$$\text{storage} = \frac{1 \text{ mole } (S + H_2O)}{(0.032 + 0.018) \text{kg}} \cdot \frac{2 \text{ faraday}}{\text{mole}}.$$

$$\frac{96500 C}{\text{faraday}} = 3.9 \times 10^6 \text{ C/kg}$$

A fifth aspect of the invention permits aluminum batteries using electrolytes in the highest alkaline hydroxide concentration domain (e.g., greater than 10 molar alkaline hydroxide). Specifically, the fifth aspect features an electrochemical half cell for use in an electrochemical storage system, and the half cell (in its fully charged state) includes: a) an anode comprising aluminum immersed in a solution comprising at least 10 molar [OH$^-$] and containing additives to enhance the anodic electrochemical storage capacity. Preferably, the additive is indium hydroxide, germanium oxide, sodium stannate, gallium oxide and imidazole. Surprisingly, such high hydroxide concentrations improve performance, notwithstanding the diminished electrolyte conductivity (solution conductivity falls off beyond 6 molar KOH). Furthermore, such improvement is achieved notwithstanding the expectation that excessive hydroxide would increase the rate of the undesired parasitic side reaction of aluminum with hydroxide in alkaline solution to generate aluminate and hydrogen. The invention thus provides an aluminum battery which can be used with an electrolyte that has an alkaline hydroxide concentration of greater than 10 molar.

The fourth aspect of the invention may be used as preferred embodiments of the first three aspects of the invention, and the fifth aspect of the invention may be used as a preferred embodiment of the first and third aspects of the invention.

Other features and advantages are apparent from the following description of the preferred embodiments and from the claims.

DESCRIPTION OF THE PREFERRED EMBODIMENT(S)

Figure 1:
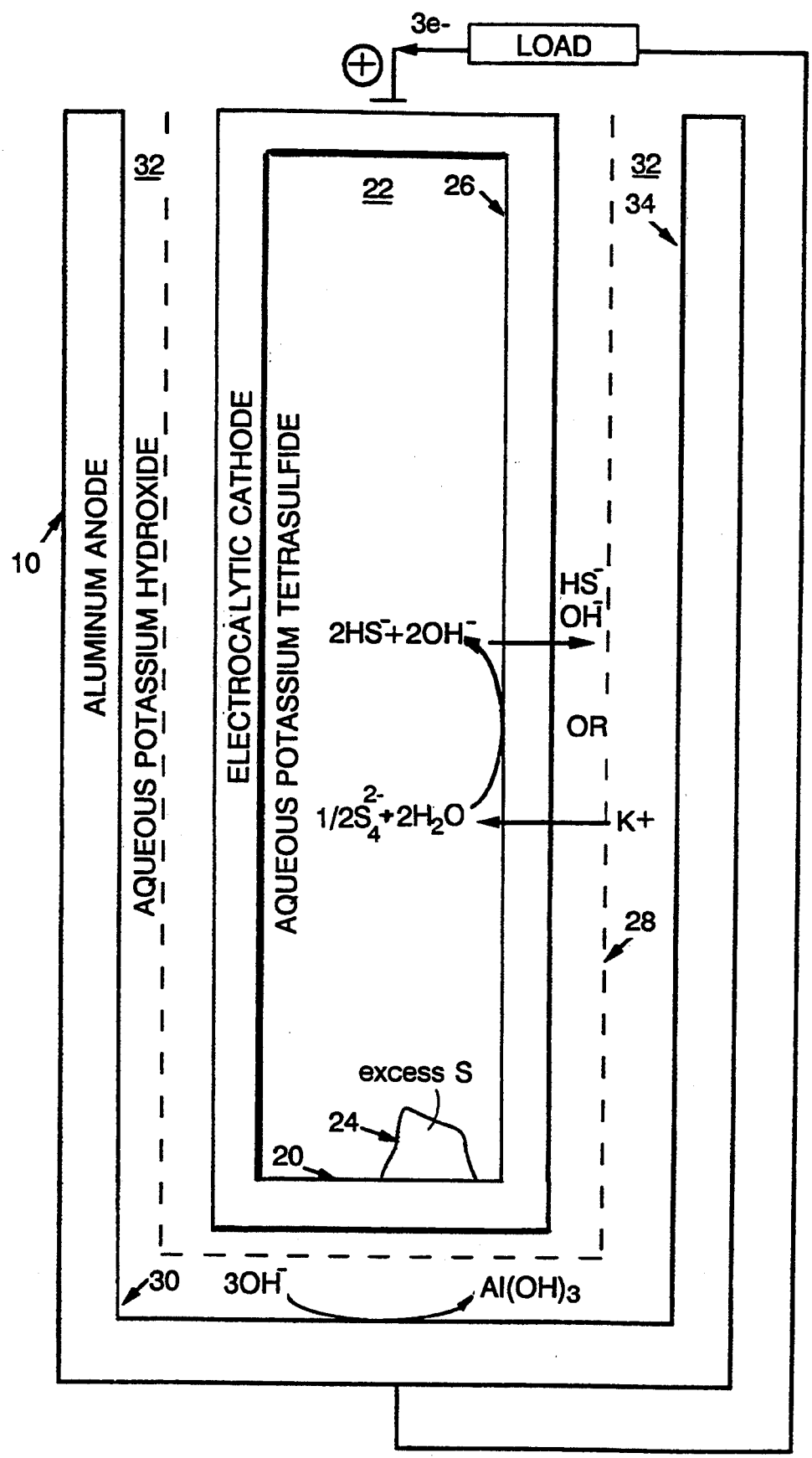
FIG. 1 is a diagrammatic representation of an aluminum/sulfur battery in alkaline aqueous solutions.

In FIG. 1, cell 10 is a diagrammatic representation of an electrochemical storage cell based on aluminum and sulfur redox couples. Specifically, half-cell 20 contains an aqueous solution 22. The solution 22 may be static or caused to flow into and out of half-cell 20, and depending on the extent of discharge or starting conditions, may contain excess solid S (sulfur) 24. Solution 22 is in contact with an electrocatalytic cathode 26. Reduction of polysulfide anions to sulfide and shorter length polysulfide anions is achieved via electrons available from electrode 26. Solution 22 in half-cell 20 is maintained in contact with KOH solution 32 in half-cell 30. Half cell 20 includes the lightweight, porous or planar electrocatalytic cathode 26, placed in contact with solution 22. Electrocatalytic cathodes include cobalt sulfide or copper sulfide. For example, a lightweight cobalt polysulfide electrode can be produced by electrodeposition of cobalt onto thin (0.001 inch) planar, screen or perforated brass, or onto RETEC porous Ni (nickel) sold by Eltech of New York, followed by alternating anodic and cathodic treatments in a polysulfide solution.

Aluminum electrode 34 is in contact with solution 32 in half-cell 30. Electrons are released in the oxidation of aluminum in electrode 34. The anode of the battery of this invention can be pure aluminum, which is readily available at a purity of at least 99.9%, or an aluminum alloy. A suitable aluminum alloy is DF50V, sold by ALCAN of New York, which contains combined contains less than one percent magnesium, tin and gallium. Solution phase additives (e.g., imidazole, indium, tin, and gallium metal oxide salts) can be added to these electrolytes to modify or stabilize aluminum discharge. Specifically, 10 mm In(OH)$_3$ (indium hydroxide) was added to 13.5 molar KOH solution. Aqueous $K_2S_4$ solution 22 is prepared by the addition of sulfur to $K_2S$ (potassium sulfide). $K_2S$ is prepared by the mass monitored reaction of KOH with H$_2$S (hydrogen sulfide).

The above described reaction discharges the battery reactants, providing heat rather than desired electrical energy. Surprisingly, aluminum is suitable as an anode to complement aqueous polysulfide cells such as those described by Licht '942, notwithstanding the highly favor undesired chemical reaction between aluminum and sulfur. This undesirable result is avoided by the use of one or more of the following processes: (i) converting the dissolved sulfur into non-reactive reduced sulfur prior to its movement and contact with the anode; (ii) physically isolating the sulfur from the anode by maintaining the majority of the sulfur in the solid phase; (iii) restricting the polysulfide ion flux towards the vicinity of the anode; and (iv) isolating the dissolved sulfur from the anode by laminar flow of the anolyte near the anode or by laminar flow of the catholyte near the cathode.

In the first strategy, the catholyte and anolyte are physically separated by a porous electrocatalyst electrode 26. During discharge sulfur is converted to non-reactive reduced sulfur while passing through the pores of electrode 26 from catholyte to anolyte chamber. In the second strategy, solid sulfur 24, soluble only upon initiation of cell discharge, is kept in contact with catholyte 22, and not in contact with aluminum anode 34. In the third strategy, a separator such as a cation selective membrane 28 impedes the exit of polysulfide anions from the catholyte chamber. Suitable membranes include cellophane or a cation selective membrane such as Permion HD2291 sold by Raipore of New York. Alternatively, in the fourth strategy, laminar flow in layers creates non turbulent flow which isolates the aluminum and dissolved sulfur.

The aqueous solutions have a conductivity of between 0.001 and 2 mho/cm. The solutions can include seawater.

As indicated above, the aqueous solutions of the battery of FIG. 1 can be static, or they can be arranged so that the battery compartments containing those solutions are part of separate flow paths. A suitable arrangement for flowing the solutions is shown in Anderson U.S. Pat. No. 3,953,239. Each of the flow paths can include a reservoir to store an electrolyte solution and a pump to move it through the flow path (made of suitable pipes or tubing). The characteristics of the electrolytes can be controlled by apparatus included in the flow paths, such as heat exchangers and thermostats to control the temperatures of the solutions, gas separators to control hydrogen or other gas buildup in the solutions, solid separators to control buildup of solids such as aluminate or other solids, and electrolyte regulators to control the concentration of salts in the aqueous solutions. The battery can also include a manifold to distribute flow of the solutions within the cells.

The following specific examples are provided to illustrate the invention, and are not intended to limit it.

EXAMPLE 1

Figure 2:
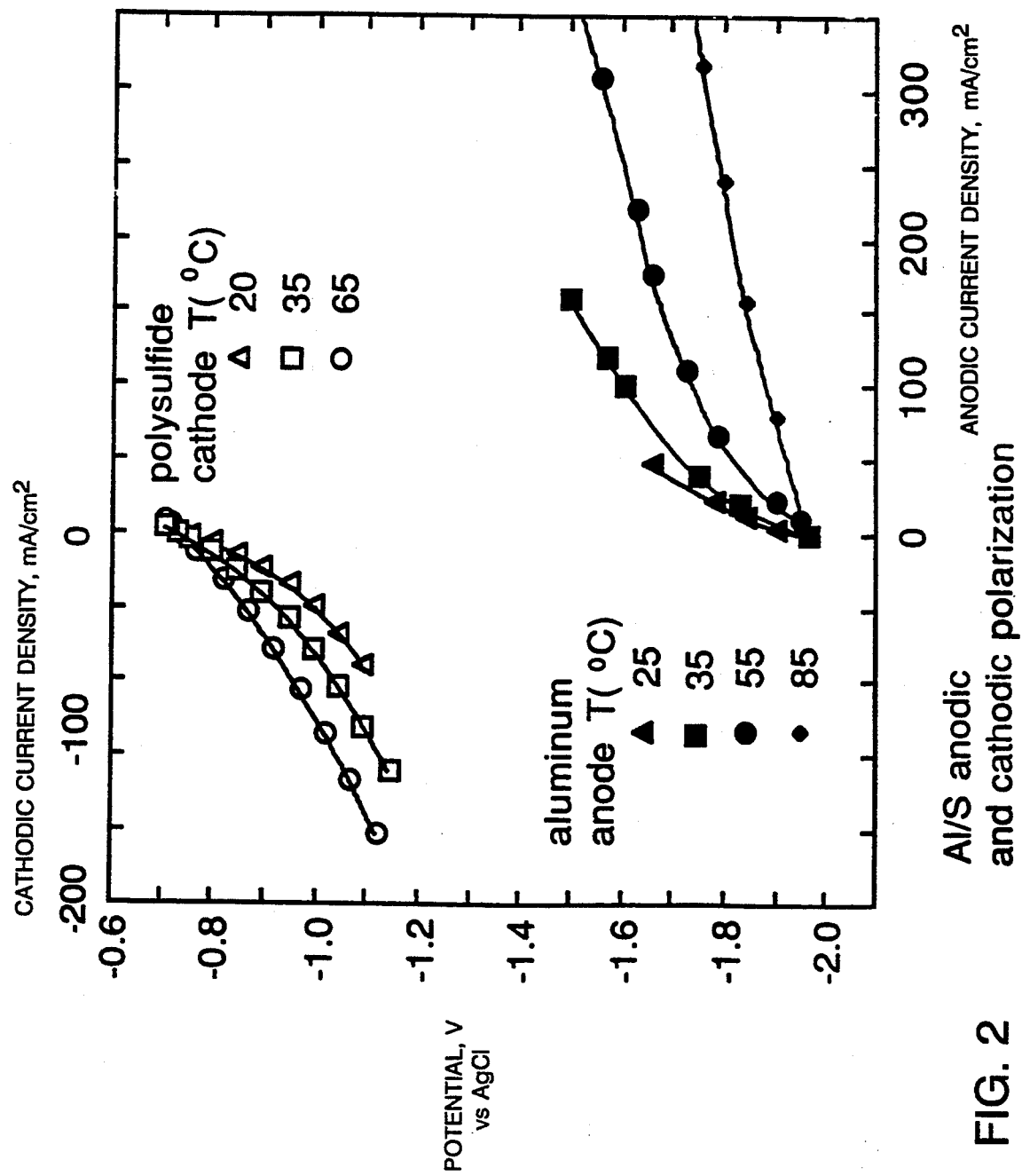
FIGS. 2 through 6 and Tables 1 and 2 are described in the examples below.

FIG. 2 illustrates rapid accessibility to, and minimal polarization losses associated with, the separate aluminum and sulfur half-cells utilized in the aluminum/sulfur battery. The top corner of FIG. 2 presents potentiostatic reduction of aqueous 7.7 m $K_2S_4$ on 1 cm$^2$ CoS (cobalt sulfide) on 0.001 inch brass at a sweep rate of 1 mV/s (milli-volts/second). The lower corner of FIG. 2 presents galvanostatic oxidation of aluminum in a stirred aqueous solution of 18 m KOH and 10 mm In(OH)$_3$ at 0.1 mV/s. [The measured oxidation polarization is similar for an anode comprised of either 99.999% Al or an alloy anode, AB50V (now DH50V) available from ALCAN. This alloy comprises over 99% aluminum and contains magnesium, gallium and tin.

EXAMPLE 2

Figure 3:
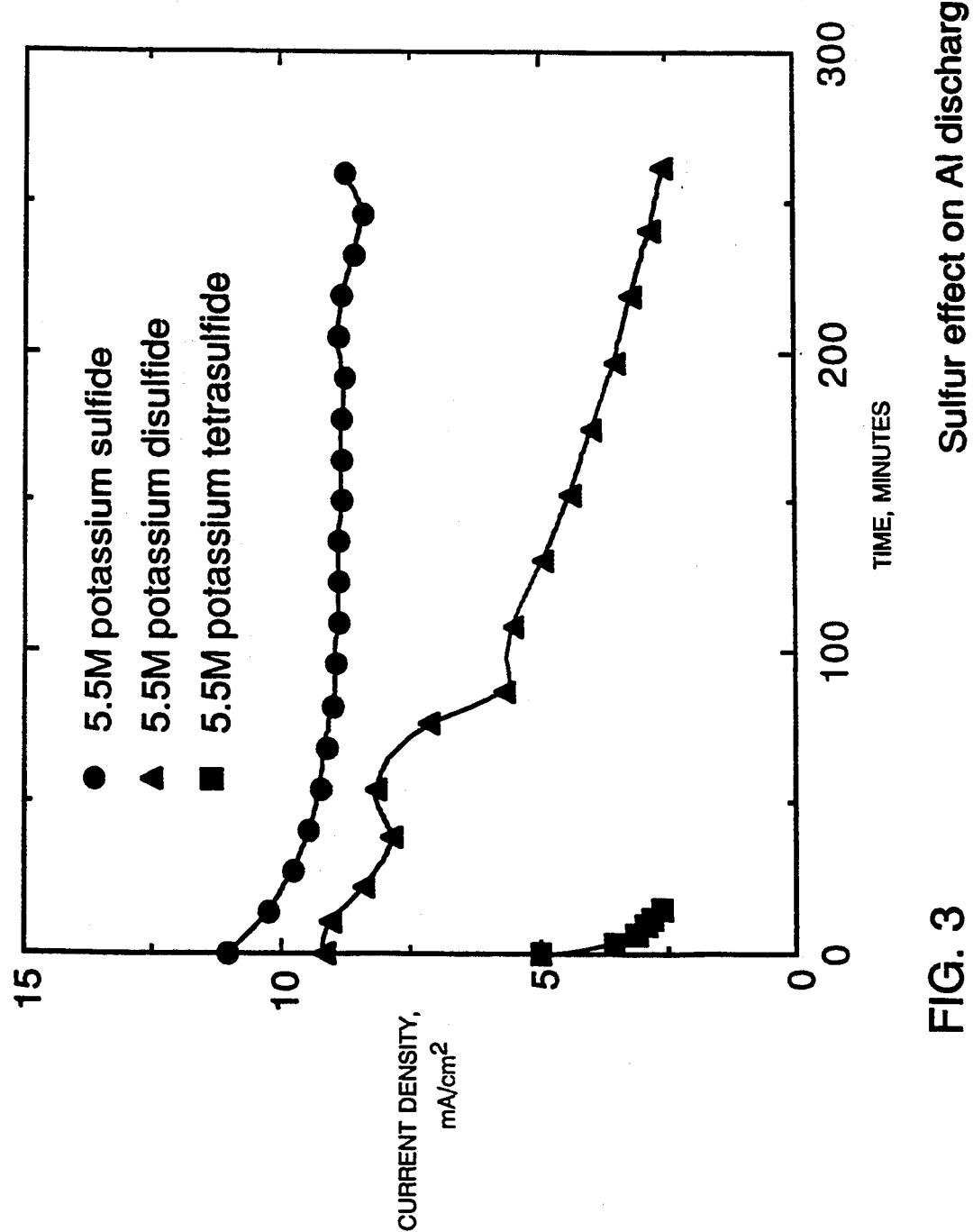
Figure 4:
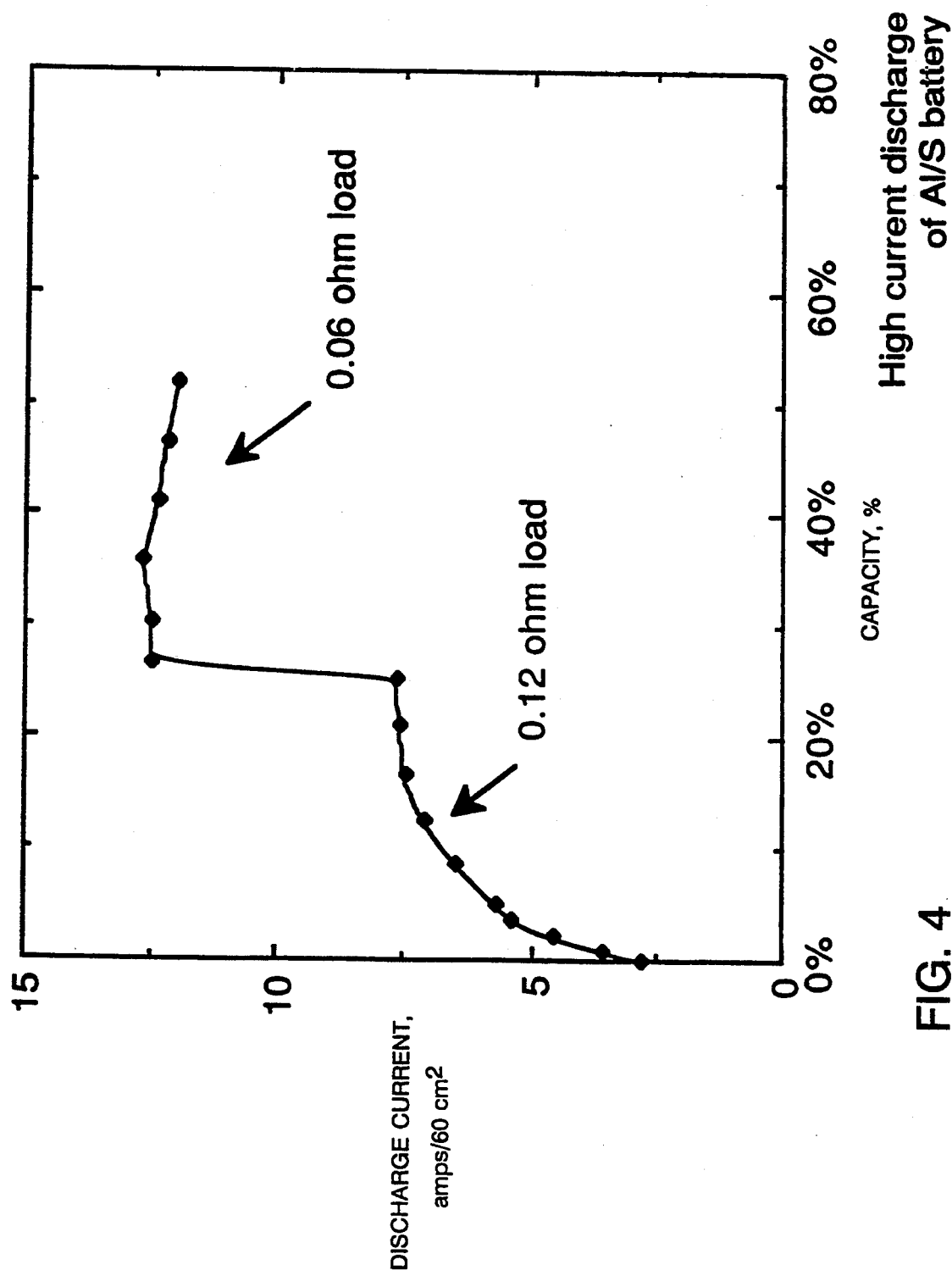

This example demonstrates discharge of aluminum anodes and an aluminum/sulfur battery in cells containing aqueous sulfur. FIG. 3 illustrates that aluminum may be substantially discharged in an aqueous $K_2S$ solution (a $K_2S$ solution is equivalently described as a solution equimolar in KHS (potassium hydrogen sulfide) and KOH), but may not be successfully discharged in an aqueous $K_2S_4$ solution. In each indicated curve, 3 cm$^2$ of aluminum is discharged over a 25 ohm resistor in 1 ml of the indicated electrolyte at 25° C. FIG. 4 illustrates the high current discharge and high storage capacity of an aluminum/sulfur battery configured in accordance with FIG. 1. The polysulfide electrolyte contains 18 ml of 7.7 m $K_2S_4$. The anodic electrolyte is comprised of 32 ml of a solution of 18 m KOH and 10 mm In(OH)$_3$. Percent capacity is determined by comparison of coulombs generated to equivalents of KOH available in the anolyte. Ionic contact between the two electrolytes is maintained through a 60 cm$^2$ porous CoS electrocatalytic cathode. The cathode contains a thin CoS film on two parallel plates of perforated 0.001 inch thick brass. The anode consists of a 60 cm$^2$ sheet of AB50V aluminum.

EXAMPLE 3

Figure 5:
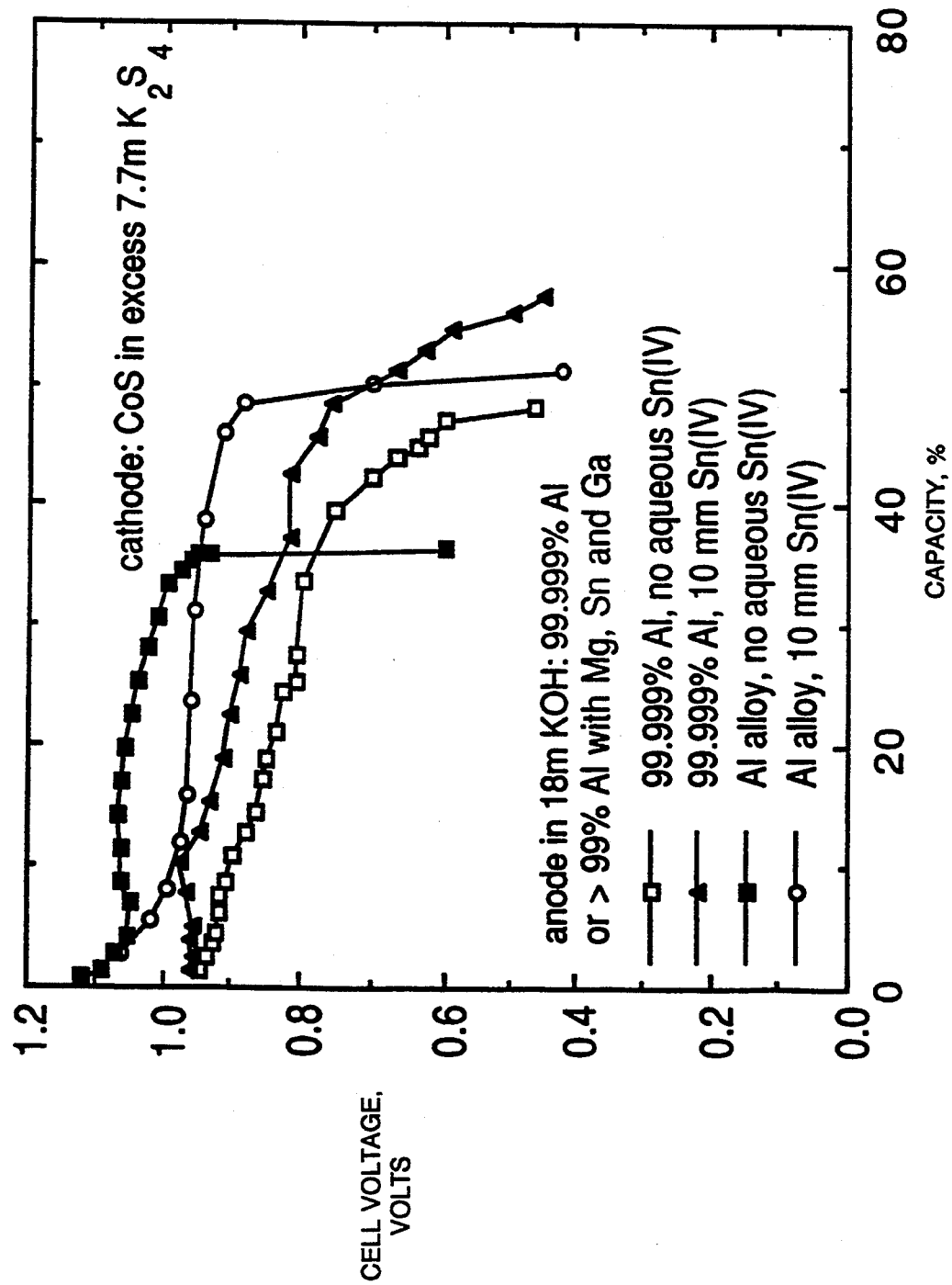

FIG. 5 and Table 1 summarize demonstrations of the discharge of small aluminum/sulfur batteries. FIG. 5 presents effects of adding an anolyte additive, and/or alloying the aluminum anode, on discharge capacity of miniature rectangular aluminum/sulfur cells at 25° C. In this example, sodium stannate (Na$_2$SnO$_3$) added to the electrolyte improves capacity for anodes consisting of either 99.999% aluminum or AB50V ALCAN aluminum. Sodium stannate added to the electrolyte increases discharge voltage in cells utilizing the 99.999% aluminum anode, but diminishes voltage for cells utilizing the alloy anode. Cells contain a 1.5 cm times 2 cm (6 cm$^2$) aluminum anode immersed in 0.9 ml 18 m KOH anolyte (with or without 10 mm Na$_2$SnO$_3$ and are separated on each side by a Raipore HD2291 membrane and 1.5 cm×2 cm (3 cm$^2$) CoS modified brass cathodes immersed in 0.5 ml of 7.7 m $K_2S_4$ catholyte. Cells are discharged over a 15 ohm load (approximately 10 mA/cm$^2$(milliamperes/cm$^2$)). Percent capacity is determined by comparison of coulombs generated to equivalents of KOH available in the anolyte. Capacity is also observed to improve at higher discharge current density.

Table 1 summarizes the discharge results of a variety of small aluminum/sulfur batteries and demonstrates that an aluminum anode may be successfully discharged to high coulombic efficiencies in alkaline hydroxide solutions more concentrated than 10 molar. Aluminum chemically reacts with hydroxide in alkaline solution, and the rate of this undesired parasitic side reaction is expected to increase in an electrolyte containing excessive hydroxide. Unexpectedly, as compiled in Table 1, in aluminum/sulfur miniature cells discharged at approximately 10 mA/cm$^2$, the coulombic conversion efficiency of anolyte KOH increased from 39 percent to 45, in 5.4 and 18 m KOH, respectively, while aluminum utilization efficiency increased to over 60 percent. This suggests that very high hydroxide concentrations promote an anodic oxide overlayer which impedes anodic decomposition without affecting facile electron transfer during discharge.

Measured open circuit aluminum/sulfur cell potential reaches its highest value of 1.37 V in a cell with a gallium oxide additive. However the gallium oxide activated aluminum surface is dominated by rapid hydrogen evolution, excessive heat generation, and poor (approximately 5 percent) aluminum and KOH coulombic utilization efficiencies. Table 1 also shows that aluminum utilization efficiency increases to greater than 60 percent with an In(OH)$_3$ additive. Amalgamating the 99.999 percent aluminum anode (by a 300 second aluminum immersion in a solution of 1 m HNO$_3$ and 50 mm Hg(NO$_3$)$_2$ (mercury nitrate) prior to discharge) resulted in coulombic efficiencies approaching 100 percent, but also increased polarization losses fourfold to over 70 (mV)(cm$^2$)/mA. Imidazole was also observed to improve utilization efficiency.

As shown in Table 1, coulombic conversion efficiencies were similar for either a Mg/Sn/Ga aluminum alloy or a 99.999% pure aluminum anode immersed in a solution of 18 m KOH and 10 mm Na$_2$SnO$_3$ electrolyte. The alloy was particularly stabilized in the In(OH)$_3$ electrolyte. Aluminum usage for the alloy immersed in 0.92 ml of a solution of 18 m KOH and 10 mm In(OH)$_3$ increased from 67 percent at 45° C. to 80 percent at 20° C. The extent of anodic discharge also affects the efficiency of hydroxide utilization. The anodic compartment containing a solution of 18 m KOH and 10 mm In(OH)$_3$ was increased in volume from 0.25 to 1.84 ml (increasing theoretical capacity to 2,400 coulombs). With the aluminum alloy anode, the increase in anodic capacity is paralleled by an observed increase in KOH utilization, from 46 to 79 percent faradaic conversion efficiencies, and an aluminum utilization efficiency in excess of 80 percent.

EXAMPLE 4

Figure 6:
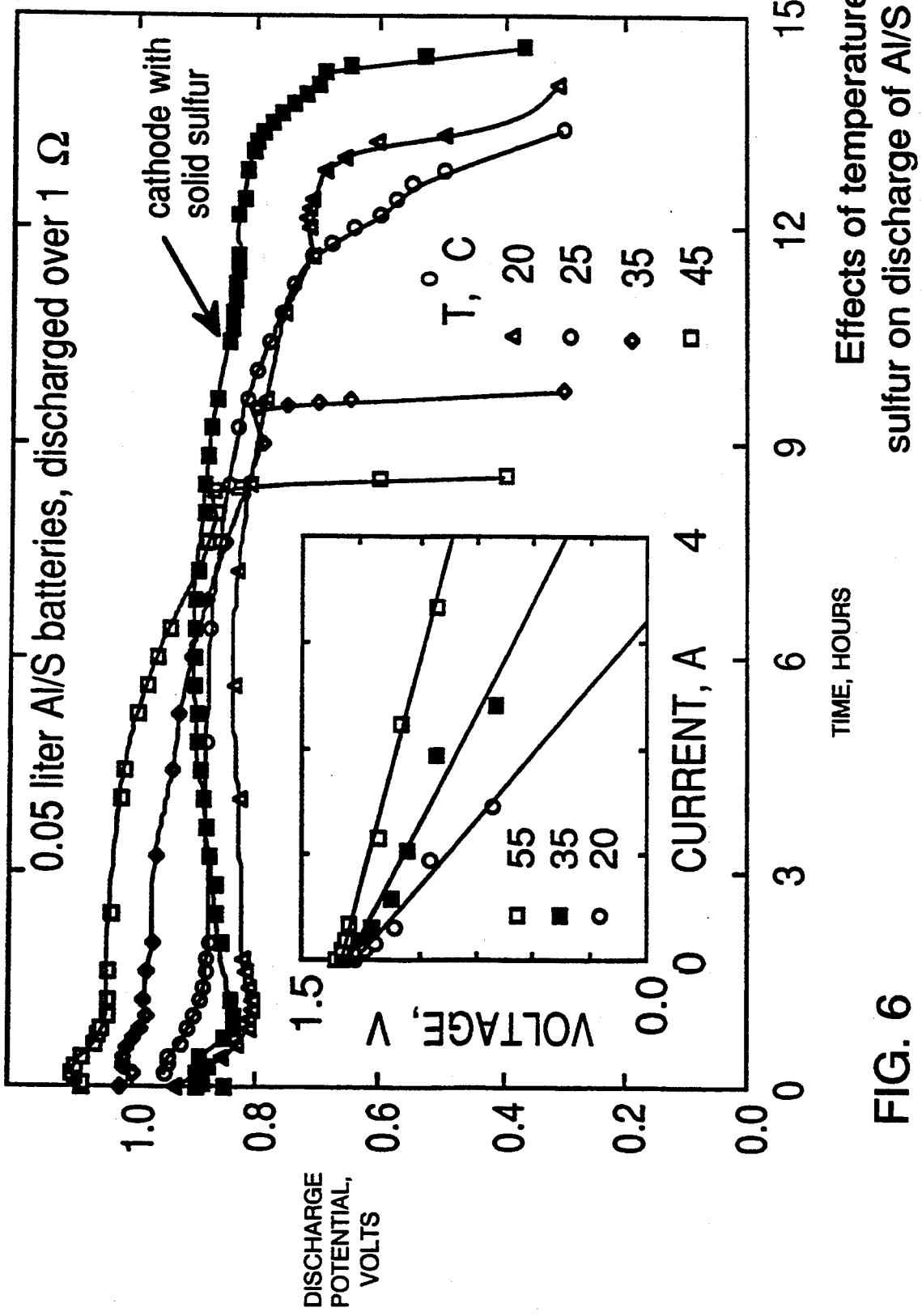

FIG. 6 presents temperature effects during discharge of larger aluminum/sulfur batteries containing approximately 0.05 L (liter) of internal materials. FIG. 6 illustrates the increase in cell voltage and decrease in discharge duration with increasing temperature. Cells are discharged over 1.03 ohm at 20°, 25°, 35° and 45° C. for rectangular cells containing 0.018 L of 7.7 m K$_2$S$_4$ catholyte and 0.032 L of a solution of 18 m KOH and 10 mm In(OH)$_3$ anolyte. A 60 cm$^2$ AB50V ALCAN aluminum anode is separated on each side by 60 cm$^2$ Raipore HD2291 membrane and 60 cm$^2$ thin film CoS cathodes. The inset shows polarization of the cell at 20°, 35° and 55° C.

Table 2 presents the extended discharge duration of aluminum/sulfur batteries compared to conventional aqueous batteries at 20° C. The aluminum/sulfur cells contain 0.018 L of 7.7 m K$_2$S$_4$ catholyte and 0.032 L of a solution of 18 m KOH and 10 mm In(OH)$_3$ in a rectangular cell geometry. Conventional cell discharge data is from D. Linden, *Handbook of Batteries*.

EXAMPLE 5

This example illustrates the ability to directly access the cathodic charge stored within solid sulfur in a polysulfide cathode, and also provides a measure of the energy density in an aluminum/sulfur battery. FIG. 6 includes discharge data of an aluminum/sulfur battery in which the majority of the cathodic charge generated originates from solid sulfur immersed in the cathodic compartment. The cathodic compartment contains 7.4 g (0.0037 L) solid sulfur, 0.0006 liter of 7.7 molal K$_2$S$_4$ catholyte containing 3.5 g of H$_2$O and 4.6 g K$_2$S$_4$, and K$_2$K$_2$S$_4$ catholyte, and a single 60 cm$^2$ thin film CoS electrode. The cell is discharged over a 1.03 ohm load at 45° C. and contains a single sided 60 cm$^2$ AB50V ALCAN aluminum anode immersed in 0.040 liter of 18 molal KOH, 10 millimolal In(OH)$_3$ anolyte containing 30.9 g of H$_2$O, 30.4 g KOH and 0.08 g In(OH)$_3$ anolyte. The anode is separated on one side by a 60 cm$^2$ Raipore HD2291 membrane, also in contact with the cathode compartment. The mass of the CoS electrode, excluding electrical contacts, is 2.1 g; the mass of consumed aluminum is 5.7 g and the mass of the membrane is 0.35 g. The 43,400 coulombs generated during discharge represents an 83 percent conversion efficiency based on KOH, a 72 percent conversion efficiency based on K$_2$S$_4$, and a 71 percent conversion efficiency based on consumed aluminum, and provided 10.3 Wh. Compared to the mass of cell components, this represents an energy density of 200 Wh/kg based on materials excluding water (modeling a "water activated" cell) and 120 Wh/kg based on total materials, a further 20 percent additional energy density was evident in cells containing more solid sulfur (up to 10 g sulfur). During discharge a thick solid Al(OH)$_3$ (aluminum hydroxide) film develops at the aluminum surface which does not affect cell performance. These energy densities compare favorably with measured energy densities for both nickel/cadmium and lead/acid batteries of 35 Wh/kg, for alkaline (such as zinc/manganese oxide) batteries of 95 Wh/kg, and for zinc/silver oxide batteries of 130 Wh/kg.

Having described the invention in detail, those skilled in the art will appreciate that modifications may be made of the invention without departing from its spirit. Therefore, it is not intended that the scope of the invention be limited to the specific embodiments described. Rather, it is intended that the scope of this invention be determined by the appended claims and their equivalents.

TABLE I

Results of a 15 ohm discharge of miniature Al/S batteries. Effects of anolyte composition and volume, aluminum alloy, temperature are indicated on open circuit cell potential and KOH and Al coulombic efficiency. Cells contains a 6 cm$^2$ Al anode (1.5 × 2 cm, both sides exposed) immersed in indicated anolyte and separated on each side by a sulfonated polyethylene (HD 2291) membrane and 6 cm$^2$ CoS modified brass electrodes immersed in 1.14 ml of 7.7 m K$_2$S$_4$ catholyte. [Additive 1] + [Additive 2] = 10 mm. In consecutive discharges, KOH usage is reproducible to 2% and Al usage to 5%.

| T (°C.) | Al type | [KOH] | Additive 1 | Additive 2 | vol. anolyte | Cell Potential | KOH usage | Al usage |
|---|---|---|---|---|---|---|---|---|
| 35 | 99.999% | 18m | — | — | 0.92 ml | 1.16 V | 37% | 39% |
| 35 | 99.999% | 18m | Ga$_2$O$_3$ | — | 0.92 ml | 1.37 V | 5% | 3% |
| 35 | 99.999% | 18m | MgO | — | 0.92 ml | 1.34 V | 39% | 56% |
| 35 | 99.999% | 18m | GeO$_2$ | — | 0.92 ml | 1.34 V | 41% | 53% |
| 35 | 99.999% | 5.4m | Na$_2$SnO$_3$ | — | 0.92 ml | 1.32 V | 39% | 49% |
| 35 | 99.999% | 12m | Na$_2$SnO$_3$ | — | 0.92 ml | 1.32 V | 39% | 56% |
| 35 | 99.999% | 18m | Na$_2$SnO$_3$ | — | 0.92 ml | 1.32 V | 45% | 60% |
| 35 | 99.999% | 18m | In(OH)$_3$ | — | 0.92 ml | 1.26 V | 42% | 62% |
| 35 | 99.999% | 18m | Ga$_2$O$_3$ | Na$_2$SnO$_3$ | 0.92 ml | 1.32 V | 25% | 17% |
| 35 | 99.999% | 18m | GeO$_2$ | Na$_2$SnO$_3$ | 0.92 ml | 1.20 V | 44% | 57% |
| 35 | 99.999% | 18m | In(OH)$_3$ | Na$_2$SnO$_3$ | 0.92 ml | 1.28 V | 41% | 60% |
| 35 | 99.999% | 18m | In(OH)$_3$ | GeO$_2$ | 0.92 ml | 1.26 V | 42% | 62% |
| 35 | 99.999% | 18m | In(OH)$_3$ | Ga$_2$O$_3$ | 0.92 ml | 1.28 V | 53% | 67% |
| 35 | DH50V | 18m | — | — | 0.92 ml | 1.26 V | 37% | 36% |
| 35 | DH50V | 18m | Na$_2$SnO$_3$ | — | 0.92 ml | 1.31 V | 42% | 50% |
| 35 | DH50V | 18m | In(OH)$_3$ | Ga$_2$O$_3$ | 0.92 ml | 1.29 V | 51% | 41% |
| 20 | DH50V | 18m | In(OH)$_3$ | — | 0.92 ml | 1.27 V | 55% | 80% |
| 35 | DH50V | 18m | In(OH)$_3$ | — | 0.92 ml | 1.28 V | 67% | 69% |
| 45 | DH50V | 18m | In(OH)$_3$ | — | 0.92 ml | 1.29 V | 56% | 67% |

TABLE I-continued

Results of a 15 ohm discharge of miniature Al/S batteries. Effects of anolyte composition and volume, aluminum alloy, temperature are indicated on open circuit cell potential and KOH and Al coulombic efficiency. Cells contains a 6 cm$^2$ Al anode (1.5 × 2 cm, both sides exposed) immersed in indicated anolyte and separated on each side by a sulfonated polyethylene (HD 2291) membrane and 6 cm$^2$ CoS modified brass electrodes immersed in 1.14 ml of 7.7 m $K_2S_4$ catholyte. [Additive 1] + [Additive 2] = 10 mm. In consecutive discharges, KOH usage is reproducible to 2% and Al usage to 5%.

| T (°C.) | Al type | [KOH] | Additive 1 | Additive 2 | vol. anolyte | Cell Potential | KOH usage | Al usage |
|---|---|---|---|---|---|---|---|---|
| 35 | DH50V | 18m | In(OH)$_3$ | — | 0.25 ml | 1.27 V | 46% | 64% |
| 35 | DH50V | 18m | In(OH)$_3$ | — | 0.46 ml | 1.28 V | 55% | 66% |
| 35 | DH50V | 18m | In(OH)$_3$ | — | 1.38 ml | 1.28 V | 74% | 70% |
| 35 | DH50V | 18m | In(OH)$_3$ | — | 1.84 ml | 1.29 V | 79% | 84% |

TABLE II

Comparison of Al/S and conventional aqueous electrochemical storage at 20° C. The aluminum/sulfur cells contain 0.018 L of 7.7 m $K_2S_4$ catholyte and 0.032 L of 18 m KOH, 10 mm In(OH)$_3$.

| | D size cells, continuous discharge time to 0.65 volts | | |
|---|---|---|---|
| load | Zinc Carbon | Alkaline | New Aluminum/Sulfur |
| 0.5Ω | 0.5 hours | 3.0 hours | 7.4 hours |
| 1.0Ω | 1.0 hour | 6.5 hours | 13 hours |
| 2.3Ω | 3.5 hours | 19 hours | 28 hours |

We claim:

1. An electrical storage cell comprising two half-cells positioned in electrochemical contact with one another, one of said half-cells comprising an anode comprising aluminum, positioned in contact with a first aqueous, electrically neutral, alkaline solution; and the remaining half-cell comprising,
   a second aqueous, electrically neutral solution comprising polysulfide anions, said second aqueous solution containing, when said storage cell is fully charged, at least 0.01 moles per kg reducible sulfur; and
   a current transferring electrocatalytic electrode positioned in electron-transferring contact with said second aqueous electrically neutral solution.

2. The electrical storage Cell of claim 1 in which the anode is 99.9% pure aluminum or an aluminum alloy.

3. The electrical storage cell of claim 1 in which at least one of said aqueous solutions is maintained in contact with a solid phase redox agent.

4. The electrical storage cell of claim 3 in which said solid phase redox agent comprises solid phase sulfur.

5. The electrical storage cell of claim 1 in which said electrocatalytic electrode comprises a porous material.

6. The electrical storage cell of claim 5 wherein said electrocatalytic electrode comprises cobalt sulfide deposited on porous nickel or porous brass.

7. The electrical storage cell of claim 1 wherein said second aqueous solution comprises a polysulfide salt containing a cation selected from the group consisting of Li$^+$, Na$^+$, K$^+$, Rb$^+$ and Cs$^+$.

8. The electrical storage cell of claim 1 wherein said second aqueous solution is an alkaline solution comprising soluble polysulfide compounds.

9. The electrical storage cell of claim 1 wherein said first aqueous solution comprises a hydroxide compound.

10. The electrical storage cell of claim 9 wherein the hydroxide compound includes a cation selected from the group consisting of Li$^+$, Na$^+$, K$^+$, Rb$^+$, and Cs$^+$.

11. The electrical storage cell of claim 1 wherein at least one of said aqueous solutions has a conductivity selected from the range of 0.001 mho/cm to 2 mho/cm.

12. The electrical storage cell of claim 1 wherein said first aqueous solution comprises an additive salt.

13. The electrical storage cell of claim 12 wherein said additive salt is indium hydroxide.

14. The electrical storage cell of claim 1 wherein the surface of said anode is pretreated to increase coulombic efficiency of said anode.

15. The electrical storage cell of claim 14 wherein said anode surface comprises amalgamated Hg.

16. The electrical storage cell of claim 1 wherein the electrocatalytic electrode is positioned between said first aqueous electrically neutral solution and said second aqueous electrically neutral solution to reduce polysulfide ions contained in said second aqueous solution, and to impede transfer of chemically reactive species between said anode and said polysulfide species of said other half-cell.

17. The electrical storage cell of claim 1 wherein said electrocatalytic electrode is porous and separates said first aqueous electrically neutral solution from said second aqueous electrically neutral solution to impede transfer of chemically reactive species between said anode and said polysulfide species of said other half-cell.

18. The electrical storage cell of claim 1 comprising means to induce laminar flow in the region of said electrocatalytic electrode to confine the polysulfide ions to said region and enhance reduction of said polysulfide ions prior to transfer of said polysulfide ions to said anode.

19. The electrical storage cell of claim 1 comprising a membrane positioned to separate said first solution from said redox species to impede transfer of chemically reactive species between said anode and said polysulfide species of said other half-cell.

20. The electrical storage cell of claim 19 wherein said membrane passes ions to effect ion current transfer.

21. The electrochemical storage cell of claim 1 in which said second half cell comprises solid sulfur in contact with said second aqueous solution, said solid sulfur being present in an amount of at least 1 percent by weight of said second aqueous solution.

22. The electrochemical cell of claim 1 in which said first solution comprises an of at least 10 molar and an additive to enhance the anodic electrochemical storage capacity.

23. The electrochemical cell of claim 22 wherein said additive is indium hydroxide.

24. A method of generating a direct current between a first contact point and a second contact point, comprising the steps of:
   providing the electrochemical storage cell of claim 1; and establishing electrical contact between said first contact point and said second contact point;

whereby said polysulfide anions are reduced and said anode is oxidized, thereby producing a complementary redox species, and generating an electrical current and potential between said first contact point and said second contact point.

25. An electrochemical half cell for use in an electrochemical storage system, said half cell comprising:
a) an aqueous salt solution comprising polysulfide anions, the solution containing at least about 0.01 moles per kg reducible sulfur;
b) solid sulfur in contact with said aqueous solution, said solid sulfur being present in an amount of at least 1 percent by weight of said aqueous solution; and
c) a current transferring electrocatalytic electrode positioned in ion current transferring contact with said aqueous solution.

26. An electrochemical half cell for use in an electrochemical storage system, said half cell (in its fully charged state) comprising:
a) an anode comprising aluminum immersed in a solution comprising an of at least 10 molar and comprising an additive to enhance the anodic electrochemical storage capacity.

27. The electrochemical half cell of claim 26 wherein said additive is indium hydroxide.

* * * * *

UNITED STATES PATENT AND TRADEMARK OFFICE
CERTIFICATE OF CORRECTION

PATENT NO. : 5,413,881
DATED : May 9, 1995
INVENTOR(S) : Licht et al.

It is certified that error appears in the above-indentified patent and that said Letters Patent is hereby corrected as shown below:

Col 11, Claim 2, line 41, "Cell" should be --cell--

Col 12, Claim 22, line 59, after "an" (first occurrence) insert --[OH]--

Col, 14, Claim 26, line 10, after "an" insert --[OH]--

Signed and Sealed this

Second Day of April, 1996

*Attest:*

BRUCE LEHMAN

*Attesting Officer*     *Commissioner of Patents and Trademarks*